United States Patent [19]

Dalziel

[11] Patent Number: 4,956,733
[45] Date of Patent: Sep. 11, 1990

[54] STORAGE MEDIA TRANSDUCER LOADING/UNLOADING AND CARRIAGE LOCK MECHANISM

[75] Inventor: Warren L. Dalziel, Monte Sereno, Calif.

[73] Assignee: Tandon Corporation, Moorpark, Calif.

[21] Appl. No.: 363,651

[22] Filed: Jun. 8, 1989

Related U.S. Application Data

[60] Division of Ser. No. 159,709, Feb. 24, 1988, Pat. No. 4,884,261, which is a continuation-in-part of Ser. No. 759,900, Jul. 25, 1985, abandoned.

[51] Int. Cl.$^5$ ............................................. G11B 5/54
[52] U.S. Cl. ................................. 360/105; 360/98.01; 360/137
[58] Field of Search ............... 360/105, 104, 98.04, 360/98.01, 98.07, 97.01; 364/708

[56] References Cited

U.S. PATENT DOCUMENTS

| | | | |
|---|---|---|---|
| 4,359,762 | 12/1982 | Stollorz | 360/98.07 |
| 4,644,429 | 2/1987 | Boe | 360/105 |
| 4,703,376 | 10/1987 | Edwards et al. | 360/105 |
| 4,742,410 | 5/1988 | Smith | 360/105 |
| 4,833,554 | 5/1989 | Dalziel et al. | 360/98.04 |

*Primary Examiner*—David J. Severin
*Attorney, Agent, or Firm*—Spensley Horn Jubas & Lubitz

[57] ABSTRACT

In a magnetic disk storage system incorporated in a removable, portable module for use in a microcomputer system, a hinged separator element having a plurality of angled surfaces is movable between first and second positions. In the first position, the disk storage system is in an operational state with magnetic transducers loaded onto the surfaces of rigid magnetic disks and a carriage which mounts cantilevered beams for the transducers being free to move radially relative to the disks. In the second position, carriage motion is inhibited by the separator element which engages the cantilevered beams to raise the transducers away from the surfaces of the disks and into unloaded positions. A spring loaded trigger member which normally engages the separator element to latch the separator element in either of the first and second positions is momentarily disengaged from the separator element to permit movement of the separator element from the first to the second position by the spring or from the second to the first positions in response to movement of the carriage.

3 Claims, 10 Drawing Sheets

STORAGE MEDIA TRANSDUCER LOADING/UNLOADING AND CARRIAGE LOCK MECHANISM

CROSS REFERENCE TO RELATED APPLICATION

This application is a divisional of U.S. Ser. No. 159,709 filed Feb. 24, 1988, now U.S. Pat. No. 4,884,261, which, in turn, is a continuation-in-part of U.S. Ser. No. 759,900 filed July 29, 1985, now abandoned.

BACKGROUND OF THE INVENTION

This invention relates to the field of disk drives used with computer systems for the storage of information, and more particularly to a method and apparatus which provides for the loading/unloading of a magnetic transducer from an associated storage medium, and the further locking of a head carriage mechanism at a selected position.

With the increased use of computers, and in particular microprocessors fabricated as integrated circuits, there has been a growing demand for devices which provide for the permanent storage of information for use therewith. In the past, there has been wide use of a magnetic medium comprised of a flexible magnetic disc, generally referred to as a floppy disk. While such a medium does provide for the permanent storage of information, both significantly improved amounts of storage as well as decreased access times have been made possible through the use of a rigid disk medium rotating at a relative high rate of speed. Broadly speaking, such a rigid disk storage apparatus is typically comprised of one or more rigid disks coated with a material having selected magnetic properties, permanently mounted in a sealed enclosure containing not only the rigid disks, but also the magnetic transducers to effect the transfer of information onto and off of the surface of the rigid disks. In normal operation, the magnetic transducers "ride" or "fly" above the surface of the rigid disk on a thin layer of air created by the rotation of the rigid disk. The magnetic transducers are consequently only in contact with the surface of the rigid disk when the rigid disk is not rotating at the desired operational speed, i.e., when the rigid disk is either turned off, or is in a transitional phase of either coming up to speed in response to being turned on, or is slowing down subsequent to being turned off. With continual refinements in the associated technology, the price and physical size of rigid disk storage devices has steadily decreased, with a corresponding increase in storage capacity and reliability. There has consequently been a growing trend toward the increased use of rigid disk media for the permanent storage of information, particularly in connection with microprocessor devices.

While the rigid disk storage devices have provided an attractive solution for the permanent storage of large amounts of information, there has nevertheless been a number of long standing problems associated with the use thereof. In particular, as the magnetic transducers associated therewith are in contact with the surface of the rigid disk medium when the apparatus is first turned on, they consequently present a significant resistance to the rotation of the rigid disk. This resistance continues until the rotational speed of the rigid disk is sufficient to generate the necessary air foil on which the magnetic transducers "fly" above the surface of the rigid disk. In designs of rigid disk units employing multiple rigid disks, there is typically a magnetic transducer associated with each side of each disk. This presents a number of undersirable situations. In particular, the presence of the magnetic transducers on the surfaces of the rigid disk media results in a requirement of a significantly greater force to rotate the rigid disk media. Once the magnetic transducers are no longer in contact with the surface of the rigid disk, the necessary force to rotate the rigid disks is significantly reduced. The requirement for greater starting torque necessarily results in greater power required by the rigid disk to reach the desired operational speed.

However, while reduced starting power requirements is an important consideration, particularly with respect to portable devices employing rigid disk storage devices which operate from a battery supply, of more significance is the undesirable abrasive contact which takes place between each surface of the rigid disk and the associated magnetic transducer during both the start up and shut down phases. Such abrasive contact is clearly undesirable, as such not only could result in damage to the surface of the rigid disk, and consequent loss of information stored thereon, but also results in undesirable wear of the magnetic transducers.

While the foregoing illustrates one situation in which undesirable contact is made with the surface of the rigid disk, there are yet other ways, particularly with respect to the typical mechanical relationship which exists between the magnetic transducers and the rigid disk media. Thus, where the rigid disk and the magnetic transducers are incorporated into a hard disk drive module that is removable from a microcomputer system for transport or other handling of the module, the transducers and the rigid disk are particularly vulnerable to damage as a result of motion and contact between the transducers and the surfaces of the rigid disk as the module is repeatedly shaken and jarred.

In a rigid disk storage device, the associated magnetic transducer is typically mounted at one end of a cantilevered positioning arm, in such a fashion that the magnetic transducer may be positioned at selected radial positions across the surface of the rigid disk by the radial movement of the cantilevered positioning arm. While such an arrangement does provide the necessary radial positioning function, movement of the magnetic transducer in a direction perpendicular to the surface of the rigid disk may occur in response to unexpected physical movement of the rigid disk enclosure. Such perpendicular motion may cause the magnetic transducer to strike the surface of the rigid disk, resulting in damage to either the magnetic transducer, the surface of the rigid disk, or both.

In addition thereto, uncontrolled motion of the magnetic transducer may occur across the surface of the rigid disk in a radial fashion when the rigid disk apparatus is in a power down state. As the positioning motor employed to position the magnetic transducer with respect to the surface of the rigid disk is permanently coupled to the magnetic transducers through the cantilevered positioning arm, the operational characteristics of the head positioning motor in a power down status will in part determine potential movement characteristics of the heads across the surface of the rigid disk. In the past, stepper motors have been widely used to effect the required positioning of the magnetic transducers. As stepper motors typically have a residual cogging torque in a power down state which tends to oppose the rotation of the shaft thereof, such cogging torque acts to inhibit motion of the magnetic transducers across the surface of a rigid disk to a limited degree. In this regard, it is to be understood that such residual cogging torque is typically not sufficient to insure the complete absence of the undesirable radial motion. However, with increasing storage densities of rigid disks, the distance between adjacent tracks on the surface of the rigid disks has steadily decreased, to the point that stepper motors frequently do not provide sufficient resolution in positioning accuracy. Consequently, different types of positioning motors are now being used, e.g., Voice Coil and D.C. motors. Unfortunately, the types of motors typically used in newer designs do not provide a residual cogging torque in the power down state. Consequently, the possibility for undesired radial motion of the magnetic transducers is significantly greater in designs employing such motors.

There have been a number of approaches taken in the past to reduce the risk of damage from the foregoing discussed factors. With respect to the rigid disk media itself, improved materials used in the manufacture thereof have resulted in rigid disk surfaces which are less susceptible to damage resulting from either an undersirable direct or abrasive contact with the magnetic transducers. In a similar fashion, improvements in the design of the magnetic transducers have likewise improved not only the ruggedness of the transducers, but have likewise reduced the possibility of damage to the rigid disk media. In this regard, it is to be understood that such improvements have operated to only reduce the risks of damage, rather than eliminate it completely.

In another approach to reduce the risk of damage, prior to removing power from the rigid disk apparatus the magnetic transducers are first positioned over an area on the rigid disk which is not used for the storage of information, e.g., the inner perimeter of the rigid disk. As a consequence thereof, contact between the magnetic transducers and the surface of the rigid disk is restricted to the surface of the rigid disk where information is not stored. While such an approach does offer some degree of reduction in the risk of damage to information stored on the rigid disk, a number of undesirable aspects are necessarily associated with this technique. In particular, a portion of the surface of the rigid disk is required, thereby reducing the surface available for the storage of information. In addition, a risk of damage to the magnetic transducer still exists. In addition, there is typically not a provision to restrict the radial motion of the magnetic transducers across the surface of the disk during the power down state. Consequently, undesirable mechanical shock or vibration could result in movement of the magnetic transducers to an area on the surface of the rigid disk used for the storage of information.

Another technique employed in the past involves the physical lifting and subsequent holding of the magnetic transducers away from the surface of the rigid disk. This process is referred to as "unloading" the magnetic transducers. Thereafter, the magnetic transducers may be lowered toward the surface of the rigid disk. This process if referred to as "loading" the magnetic transducers. The loading and unloading of the magnetic transducers is typically performed by an associated mechanism.

In the past, loading and unloading of magnetic transducers has been typically accomplished through geometric design characteristics of the cantilevered beam to which the magnetic heads are attached, in conjunction with a statically positioned separating element. The magnetic transducers are unloaded in response to being positioned radially outward past a selected peripheral point. In a similar fashion, the magnetic transducers may be loaded by being positioned radially inward past the selected peripheral point. While such approach does provide for the loading and unloading of the magnetic transducers, such a design typically requires a longer head carriage stroke, and must incorporate a separate mechanism to prevent radial motion of the head carriage assembly.

With increased emphasis on portability of microprocessor based devices, and the use of rigid disks as storage devices in connection therewith, the aforedescribed conditions become even more significant.

In addition to the foregoing, advances in the technology relating to storage media are expected to likewise require either a non-contacting or a closely controlled contacting relationship between the storage medium and associated transducers.

There is consequently a significant need for a method and apparatus which provides for the unloading of magnetic transducers from an associated storage media, as well as a means to restrict undesirable radial motion of the magnetic transducers across the surface thereof.

SUMMARY OF THE INVENTION

In accordance with the present invention, a method and apparatus are disclosed which provide for the selective loading and unloading of one or a plurality of magnetic transducers, while simultaneously inhibiting radial motion of the magnetic transducers across the surface of an associated storage medium. Broadly stated, a separator element is configured for motion in close proximity to the cantilevered members onto which the magnetic transducers are affixed. In a first position of the separator element, normal operation of the head carriage assembly may occur, i.e., the magnetic transducers are in a loaded state, and radial motion of the magnetic transducers is not inhibited. In a second position of the separator element, however, the magnetic transducers are unloaded from the rigid disk medium, and an associated carriage assembly is locked in a selected position, thereby inhibiting radial motion of the magnetic transducers. The transition between the two positions of the separator element operates to perform the unloading/loading of the magnetic transducers.

The separator element has one or a plurality of selectively angled surfaces which, when brought into contact with a portion of a cantilevered beam associated with a magnetic head by the rotational travel between the aforegoing described two positions, operates to effect vertical movement of the magnetic transducers affixed to the cantilevered beam. In particular, when the separator element is moved from the first position toward the second position, the selectively angled surface on the separator element is brought into contact with the cantilevered beam in such a manner that continued rotation of the separator element toward the second position operates to effect vertical displacement of the cantilevered beam, and consequently vertical displacement of the magnetic head, in a direction perpendicular to, and away from, the surface of the storage medium. In a similar fashion, movement of the separator element from the second position toward the first position operates to effect vertical displacement of the cantilevered beam, and consequently vertical displacement of the magnetic head, in a direction perpendicular to, and toward the surface of the storage medium. Consequently, motion of the separator element between the first and second positions operates to effect vertical motion of an associated magnetic head either toward or away from the storage medium. Positioning of the separator element in the second position further operates to inhibit radial motion of the magnetic transducers by preventing motion of the head carriage assembly.

In certain preferred embodiments according to the invention, the head carriage assembly is movable along an axis which is radial to and which intersects the axis of rotation of the magnetic disk. The separator element which may be of generally planar configuration is pivotable about an axis which is generally parallel to and in a fixed location relative to the axis of rotation of the disk and is disposed to the side of the carriage axis between the carriage and the magnetic disk.

A further feature of the present invention provides for the effective locking of the separator element in both the first and second positions.

In addition to the foregoing, the energy necessary to effect motion of the separator element from the first position to the second position is stored in a spring device. As a consequence thereof, it is only necessary to trip a trigger element to effect the unloading of the magnetic transducers from the rigid disk media, and the locking of the head carriage mechanism in a selected position. In particular, according to the method and apparatus of the present invention, displacement of a point of connection of the spring to the separator element from an axis of rotation thereon toward the desired direction of rotation produces a stored torque acting about the axis of rotation of the separator element. The second point of connection of the spring to the trigger element is in such a fashion that the trigger element is drawn against the separator element in abutting contact thereto to inhibit the movement thereof. Consequently, stored energy in the spring operates to maintain the separator element in the first position. Movement of the trigger element in such a fashion to separate the abutting contact between the separator element and the trigger element operates to release the restraining force provided thereby, allowing the energy stored in the spring to effect rotation of the separator element into the aforedescribed second position. Movement of the separator element from the first position to the second position effects the unloading of the magnetic transducers. Location of the separator element in the second position operates to prevent radial motion of the magnetic transducers by producing a restraining force inhibiting motion of the head carriage assembly.

Once the separator has reached the second position, restoring the trigger element to its original position operates to lock the separator element in the aforedescribed second position through a geometric locking relation between a surface on the separator element and the trigger element.

Broadly stated, the separator element is returned to the first position by moving the trigger element in such a manner to release the aforedescribed geometric locking relation therebetween. Motion of the head carriage assembly then operates to move the separator element back toward the first position. Thereafter, release of the trigger element operates to complete the return of the separator element to the first position.

Once the separator element has returned to the first position, the trigger element functions to maintain the separator element in the first position by providing a continuous torque thereon.

In an alternate embodiment of the present invention, motion of the head carriage assembly may be combined with the operation of the trigger element to effect unloading of the magnetic head in a selected, controlled manner.

A further feature of the present invention are the operation requirements of the separator element. In particular, it is only necessary to temporarily remove the contact between the trigger element and the separator element to effect the unloading of the magnetic heads and locking of the head carriage mechanism. In a similar manner, it is only necessary to again temporarily remove the contact between the trigger element and the separator element to un-lock the head carriage mechanism, and with subsequent motion of the head carriage assembly to effect the loading of the magnetic heads and the return of the separator element to the aforedescribed first position. According to the method and apparatus of the present invention, energy is only required to effect transitions between the two positions of the separator element. It should be particularly noted that energy is not required to maintain the separator element in either the first or second positions.

In a preferred embodiment of apparatus according to the invention, a disk storage system which includes a plurality of rigid magnetic disks together with a drive motor for the disks and a head carriage assembly for positioning a plurality of magnetic transducers relative to the magnetic disks is mounted within an enclosure and forms the principal portion of a hard disk drive module. The module is removably loaded into a microcomputer system which provides electrical power and control and data signals to the disk storage system for the operation thereof. The module can be removed from the microcomputer system for transport and storage of the module separate from the microcomputer system. The disk storage system includes a separator element which functions in cooperation with the head carriage assembly and cantilevered beams mounted thereon to load and unload the magnetic transducers. The magnetic transducers are moved into and held in the unloaded position when the module is removed from the microcomputer system, thereby preventing damaging contact between the transducers and the surfaces of the rigid disks in response to motion of the module and shocks thereto.

In the preferred embodiment of apparatus according to the invention, the separator element has a plurality of arms extending from a common member for disposition between pairs of the cantilevered beams. Each of the arms terminates in a partially triangular-shaped element having opposite sloped edges which form selectively angled surfaces and which contact and move an associated pair of the cantilevered arms and the included magnetic transducers away from the opposite surfaces of an associated one of the rigid magnetic disks as the separator element is moved into the second position. The head carriage assembly includes a carriage on which the cantilevered beams are mounted. The carriage is slidable along a pair of guide rods having axes of elongation extending radially relative to the magnetic disks. The carriage is moved along the guide rods in opposite directions by a stepper motor coupled to the carriage by a rack and pinion arrangement.

In the preferred embodiment of apparatus according to the invention, the trigger member is coupled via a link to the armature of a solenoid assembly. The trigger member is momentarily separated from its abutting contact with the separator element against the resistance of a spring coupled between the trigger member and the separator element by energizing the solenoid assembly. Energization of the solenoid assembly moves the armature thereof such that the link coupled between the armature and the trigger member rotates the trigger member against the resistance of the spring. With the separator element in the first position, momentary energization of the solenoid assembly disengages the trigger member from the separator element long enough to allow the spring to move the separator element into the second position in which the magnetic transducers are unloaded. The trigger member then locks the separator element in the second position to prevent movement of the carriage toward the magnetic disks. With the solenoid assembly again energized to momentarily uncouple the trigger member from the separator element, the separator element is returned to the first position in response to movement of the carriage toward the magnetic disks.

In accordance with the present invention, a method and apparatus is disclosed which provides not only for the loading and unloading of magnetic transducers from an associated storage medium, but also for inhibiting the radial motion of magnetic transducers across the storage medium by preventing motion of a head carriage mechanism.

Figure 1:
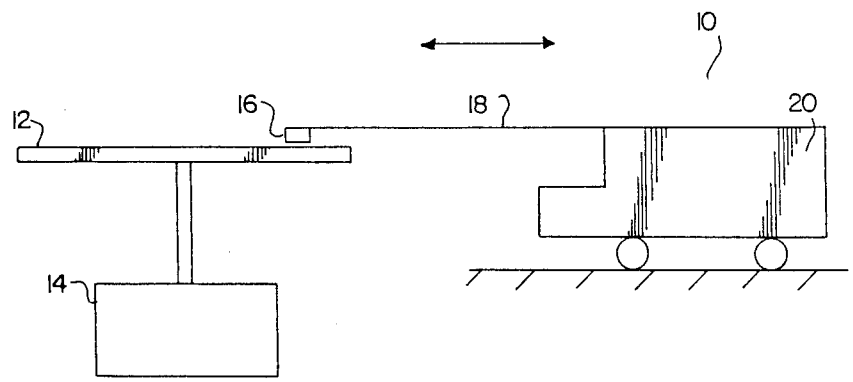
FIG. 1 is a functional illustration of a rigid disk with associated magnetic transducer, cantilevered beam, and carriage assembly.

FIG. 1 broadly illustrates several of the functional elements of a typical rigid disk storage system 10. Referring to FIG. 1, a rigid disk 12 is coupled to a motor 14, which operates to rotate the rigid disk 12. A magnetic transducer 16 mounted at one end of a cantilevered beam 18 operated to effect the transfer of information to and from the rigid disk 12. The cantilevered beam 18 is coupled to a carriage 20 which is configured to move in one dimension by a motion means (not shown). The magnetic transducer 16 is moved in a radial fashion across the surface of the rigid disk 12 by the motion of the carriage 20. For the purposes of the present discussion, the magnetic transducer 16, the cantilevered beam 18, and the carriage 20 will be hereinafter referred to collectively as the head carriage assembly 22.

Figure 2:
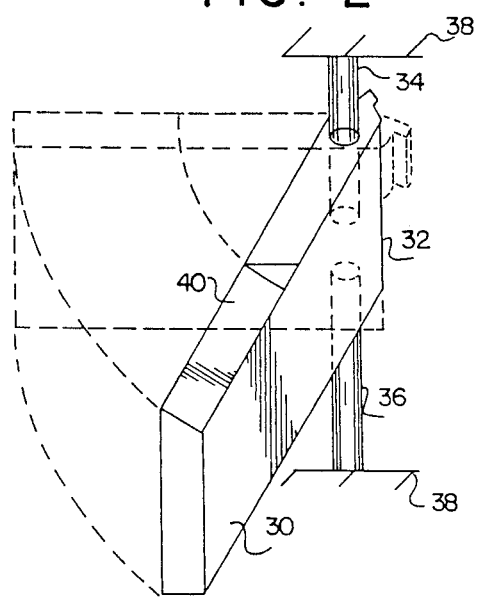
FIG. 2 is a perspective view of a functional illustration of an embodiment of a hinged separator element in accordance with the present invention.

Referring now to FIG. 2, in accordance with the present invention a separator element 30 is hinged for rotation along one end 32 thereof. In the preferred embodiment, the function of the hinge is achieved through the use of pins 34 and 36 which function not only to provide a means for mounting the separator element 30 to a desired structure 38, but also to provide for the hinged rotation thereof. It is again to be understood that while the preferred embodiment employs a pin arrangement to effect the desired rotation of the separator element 30 about one end 32 thereof, many other configurations would likewise be apparent to one of ordinary skill in the art. Consequently, the particular manner chosen to effect the above described rotation of the separator element 30 is not to be considered in a manner so as to limit the present invention to the use of pins to achieve the desired rotation.

The separator element 30 has further associated therewith a surface 40 which is at an oblique angle to the direction of rotation of the separator element 30.

Figure 3:
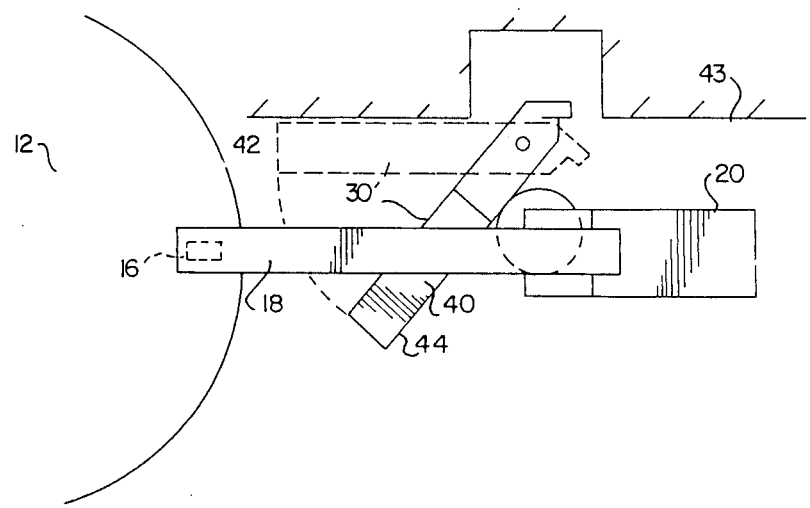
FIG. 3 is a top view of a functional illustration of an embodiment of a hinged separator element in accordance with the present invention, in conjunction with a rigid disk, magnetic transducer, and head carriage assembly.

FIG. 3 broadly illustrates, from an overhead perspective, the positional relationships between the separator element 30, the head carriage assembly 22, and the rigid disk 12 previously discussed with respect to FIG. 1. FIG. 3 is similar to FIGS. 1 and 2, and corresponding elements have been given like reference designators. Referring now to FIG. 3, the carriage 20 is movable along an axis radially disposed relative to the disk 12 and intersecting an axis of rotation of the disk 12. The separator element 30 is rotatable about an axis which is parallel to and in a fixed location relative to the axis of rotation of the disk 12 and which is disposed to the side of the axis of movement of the carriage 20 between the carriage 20 and the disk 12. The separator element 30 may be rotated between a first position 42, illustrated in dotted lines in FIG. 3, and a second position 44, illustrated in solid lines in FIG. 3. In the first position 42, the separator element 30 is positioned out of the path of travel of the head carriage assembly 22, and adjacent to a support wall 43 parallel to the surface of the separator element 30. Consequently, movement of the carriage 20 operates to position the magnetic transducer 16 in a radial fashion across the surface of the disk 12. However, first positioning the carriage 20 such that the magnetic transducer 16 is positioned over the outer periphery of the disk 12, and thereafter moving the separator element 30 into the second position 44, operates to place a portion of the separator element 30 in the line of travel of the head carriage assembly 22, thereby restricting the radial motion of the magnetic transducer 16 across the surface of the disk 12.

Figure 4:
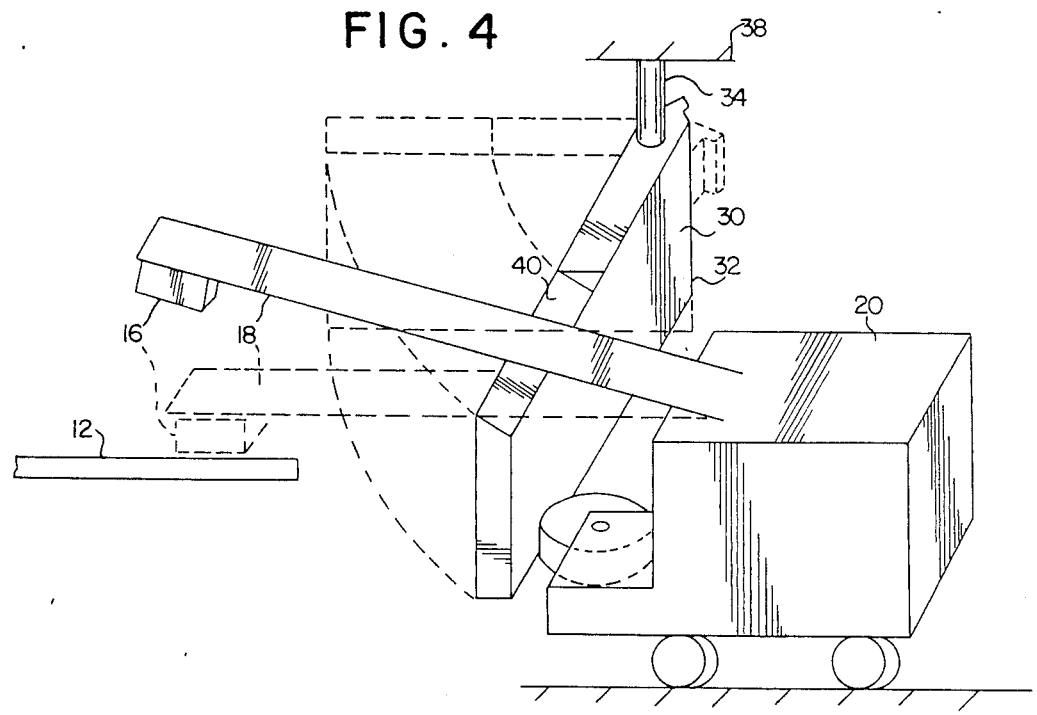
FIG. 4 is a perspective view of a functional illustration of an embodiment of a hinged separator element in accordance with the present invention, in conjunction with a rigid disk, magnetic transducer, and head carriage assembly.

FIG. 4 is a side perspective view of the apparatus of FIG. 3. Corresponding elements have again been given like reference designators. Referring now to FIG. 4, as the separator element 30 is moved from the first position 42 to the second position 44, the surface 40 which is obliquely angled will be brought into contact with the surface of the cantilevered beam 18. In particular, movement of the separator element 30 into the path of the head carriage assembly 22 will operate to unload the magnetic transducer 16 up off the surface of the rigid disk 12 by the movement of the oblique angled surface 40 along the surface of the cantilevered beam 18. In a similar fashion, movement of the separator element 30 from the second position 44 back to the first position 42 will, in a similar manner, operate to load the magnetic transducer 16 onto the surface of the rigid disk 12. It should be particularly noted that the rate at which the magnetic transducer 16 is loaded onto the surface of the rigid disk 12 may be directly controlled through the rate at which the carriage 20 advances toward the rigid disk 12. It will be further noted that movement of the separator element 30 from the second position 44 to the first position 42 also operates to remove the separator element 30 from the path of travel of the carriage 20. Consequently, the magnetic transducer 16 may again be moved in a radial fashion across the surface of the rigid disk 12 by motion of the carriage 20.

In the particular embodiment shown, the surface 40 is at an angle of approximately 75 degrees with respect to the plane of the separator element 30.

Figure 5:
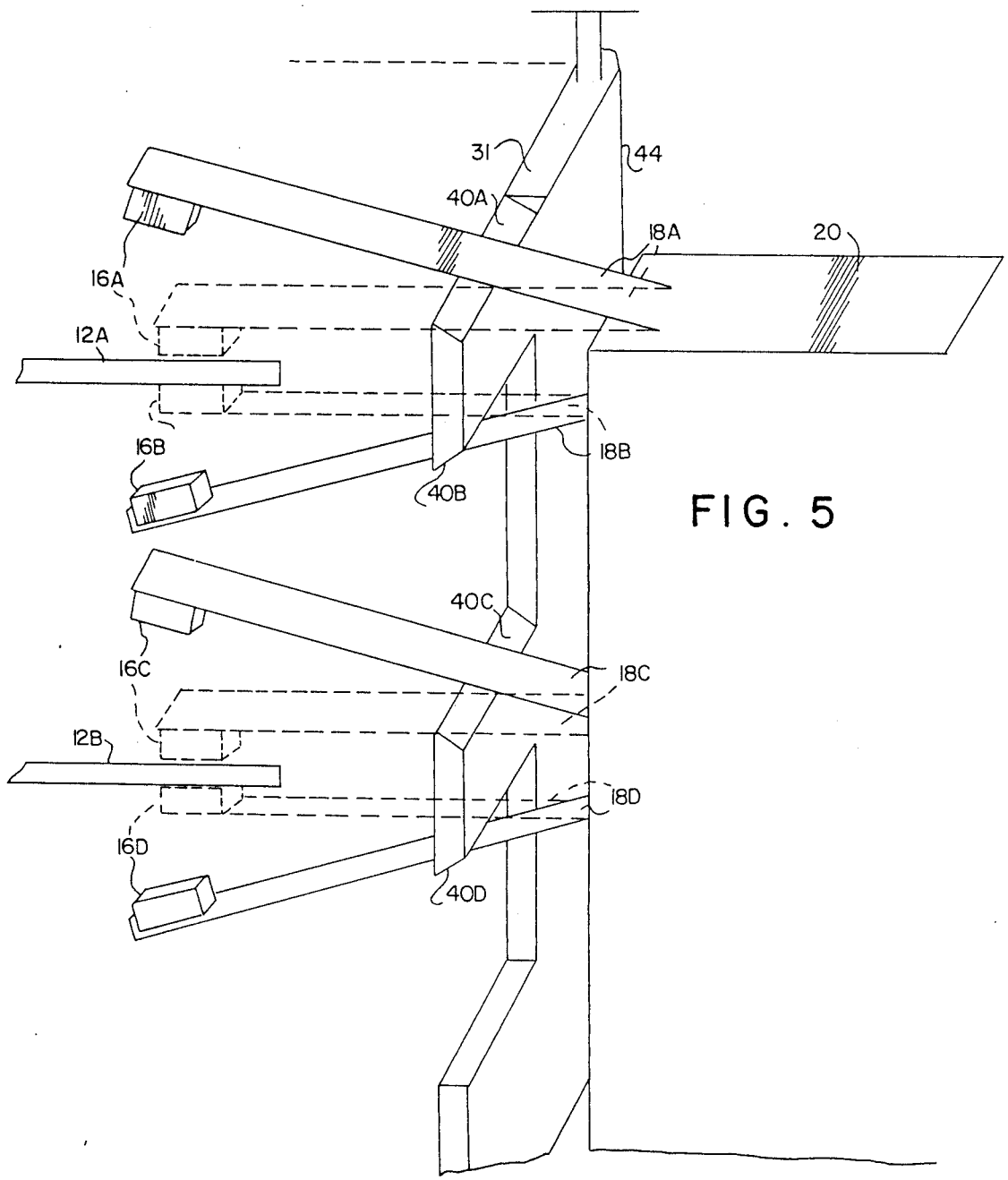
FIG. 5 is a perspective view of a functional illustration of an alternate embodiment of a hinged separator element in accordance with the present invention, in conjunction with a rigid disk, magnetic transducer, and head carriage assembly.

While the apparatus of FIG. 4 illustrates the operation of the separator element 30 with respect to a single magnetic transducer 16 and an associated single surface of the rigid disk 12, it will be understood that the foregoing described inventive concepts may be easily extended to a plurality of magnetic transducers and associated surfaces of the rigid disk storage media, as broadly illustrated in FIG. 5. FIG. 5 is a side perspective view of a plurality of rigid disks, magnetic transducers with associated cantilevered beams, and carriage and separator elements configured for a plurality of cantilevered beams. The magnetic transducers and associated cantilevered beams in FIG. 5 are illustrated in their loaded state by dotted lines, and in their unloaded state by solid lines.

Referring now to FIG. 5, a rigid disk 12A has associated therewith magnetic transducers 16A and 16B, mounted at the end of cantilevered beams 18A and 18B, respectively. In a similar fashion, a rigid disk 12B has associated therewith magnetic transducers 16C and 16D, mounted at the end of cantilevered beams 18C and 18D, respectively. The cantilevered beams 18A, 18B, 18C, and 18D are coupled to the carriage 20. Consequently, the magnetic heads 16A, 16B, 16C, and 16D may be moved in a radial fashion across the upper and lower surfaces of the rigid disks 12A and 12B, respectively, by the motion of the carriage 20. A separator element 31 is similar to the separator element 30 previously discussed with respect to FIGS. 2, 3, and 4, and corresponding portions thereon have been given like reference designators. The separator element 31, however, instead of having a single oblique angled surface 40 as was the case with respect to the separator element 30, has a plurality of oblique angled surfaces 40A, 40B, 40C, and 40D; i.e., an oblique angled surface for each side of the rigid disk, and associated magnetic transducers and cantilevered beams.

In a similar fashion as was previously discussed with respect to the separator element 30, the separator element 31 may be moved between the first position 42, illustrated in FIG. 5 in dotted lines, and the second position 44, illustrated in FIG. 5 in solid lines. In the first position 42, the separator element 31 is not in the line of travel of the carriage 20, and is adjacent to the support wall 43 (not shown), parallel to the surface of the separator element 30. In the second position 44, the separator element 31 is in the line of travel of the carriage 20, thereby preventing the motion thereof.

As was the case with respect to a single cantilevered beam previously discussed with respect to FIG. 4, movement of the separator element 31 in FIG. 5 from the first position 42 toward the second position 44 will bring each of the oblique angled surfaces into contact with a corresponding cantilevered beam; the oblique angled surfaces 40A, 40B, 40C, and 40D will be brought into contact with the cantilevered beams 18A, 18B, 18C, and 18D, respectively. Thereafter, continued movement of the separator element 31 toward the second position 44 will vertically remove the magnetic transducers 16A, 16B, 18C, and 16D from the respective surfaces of the rigid disks 12A and 12B. As was the case with respect to the separator element 30, when the separator element 31 reaches the second position 44, radial motion of the magnetic transducers 16A, 16B, 16C, and 16D across the surfaces of the rigid disks 12A and 12B, respectively will be inhibited by the presence of the separator element 31 in the line of travel of the carriage 20. Consequently, when the separator element 31 is in the second position 44, the magnetic transducers will be removed from the surface of the respective rigid disks, and radial motion of the respective magnetic transducers across the surfaces will be inhibited.

In a similar fashion as was discussed with respect to FIG. 4, movement of the separator element 31 from the second position 44 toward the first position 42 will operate to position the magnetic transducers 16A, 16B, 16C, and 16D onto the respective surfaces of the rigid disks 12A and 12B. In addition, radial movement of the magnetic transducers 16A, 16B, 16C, and 16D across the respective surfaces of the rigid disks 12A and 12B will again be enabled by the movement of the separator element 31 out of the line of travel of the carriage 20.

It will be recognized by those skilled in the art that while the separator elements 30 and 31 previously discussed were implemented in the form of relatively thin, planar elements having surfaces oblique to the direction of travel, that the aforedescribed function of such a separator element may be implemented in yet other configurations, including a rotatable cylinder having surfaces at an oblique angle to the surface of the rigid disk 12. It is consequently to be understood that the foregoing described embodiment is for illustration of the operation of apparatus and methods in accordance with the present invention, and other implementations which perform the same or similar function are to be considered within the spirit and scope of the present invention.

Figure 6:
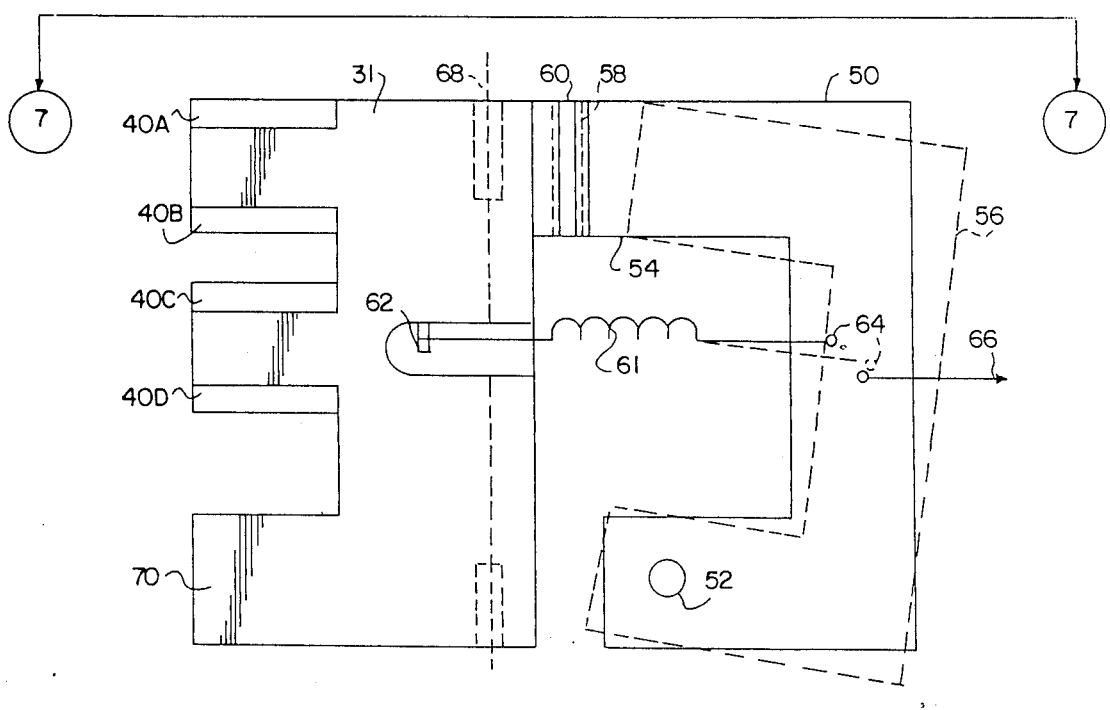
FIG. 6 is a functional side view of the alternate embodiment of the hinged separator element of FIG. 5, with an associated trigger element in accordance with the present invention.

Turning now to the rotational characteristics of the separator element, FIG. 6 broadly illustrates a side view of the separator element 31 previously discussed with respect to FIG. 5, and wherein corresponding elements have been given like reference designators. The separator element 31 has a trigger element associated therewith. The trigger element is in abutting contact with a surface on the separator element 31 when the separator element 31 is in either the aforedescribed first or second positions. In the illustrated embodiment, the functions of the trigger member are implemented through the use of a pivoted member, i.e., a trigger member 50. The trigger member 50 may be positioned between a first position 54, indicated in solid lines in FIG. 6, and a second position 56, indicated in dashed lines in FIG. 6. In the first position 54, an edge 58 of the trigger member 50 is in abutting contact with an edge 60 of the separator element 31. In the second position 56, the edge 58 of the trigger member 50 is not in abutting contact with the edge 60 of the separator element 31. The edges 58 and 60 of the trigger member 50 and the separator element 31 are more fully illustrated and discussed with respect to FIG. 7 hereinafter.

The separator element 31 is coupled to the trigger element 50 by a spring 61. The spring 61 is configured between a spring coupling point 62 on the separator element 31 and a spring coupling point 64 on the trigger element 50. The spring 61 consequently operates to keep the trigger member 50 in abutting relation with the separator element 31. While the trigger element 50 will, due to the influence of the spring 61, maintain the previously discussed abutting relation with the separator element 31, the trigger element 50 may be moved to the second position 56 by the application of a trigger force 66 (represented by an arrow in FIG. 6), as more fully discussed hereinafter. For the purposes of the following discussion, an axis of rotation 68 is the axis about which the separator element 31 rotates in moving between the previously discussed first and second positions 42 and 44, respectively.

Figure 7:
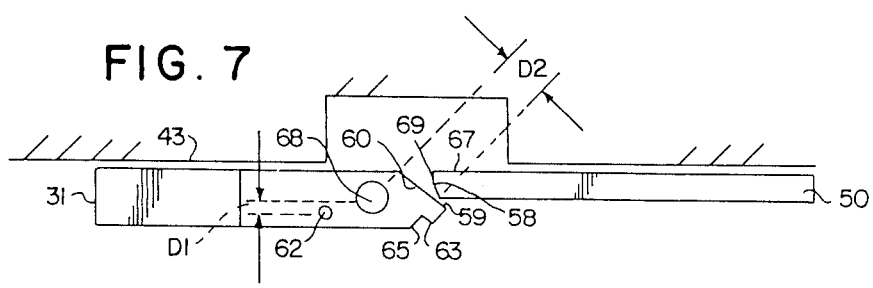
FIG. 7 is a top view of the apparatus of FIG. 6, illustrating the hinged separator element in the first position.

FIG. 7 is a top view of the separator element 31 and the trigger member 50 previously discussed with respect to FIG. 6. FIG. 7 further illustrates relational position information of the spring coupling point 62 with respect to the axis of rotation 68, as well as further details relating to the nature of the abutting surfaces between the separator element 31 and the trigger member 50.

Referring now to FIG. 7, it will be observed that the plane in which the force acts through the spring coupling point 62 on the separator element 31 is displaced from the axis of rotation 68 by a perpendicular distance of D1. Consequently, the spring 61 will produce a rotational torque on the separator element 31 about the axis of rotation 68 of the separator element 31 proportional to the distance D1.

Referring now to the relation between the edge 60 of the separator element 31 and the edge 58 of the trigger member 50 previously referenced, the edge 60 of the separator element 31 is parallel to the axis of rotation 68, at an oblique angle to the plane of the separator element 31, and adjacent to the support wall 43. In the preferred embodiment, the edge 60 is at an angle of approximately 50 degrees with respect to the plane of the separator element 31. The edge 58 of the trigger member 50 is likewise parallel to the axis of rotation 68 and at an oblique angle to the plane of the separator element 31. In the preferred embodiment, the oblique angle of the edge 58 is different from the oblique angle of the edge 60 of the separator element 31. In particular, the oblique angle of the edge 58 is greater than the oblique angle of the edge 60 of the separator element 31, as more fully discussed hereinafter. The edge 58 of the trigger member 50 is in abutting contact with the edge 60 of the separator element 31 at the point 59. As the spring 61 is coupled to the trigger member 50 at the spring coupling point 64 as previously discussed, the abutting contact with the edge 60 of the separator element 31 at the point 59 produces a torque about the axis of rotation 68 of the separator element 31 in a direction opposite to that previously discussed with respect to the distance D1. The perpendicular distance between the plane in which the force resulting from the aforedescribed abutting contact between the point 59 and the edge 60 from the axis of rotation 68 is a distance D2. Consequently, the spring 60 will produce a rotational torque on the separator element 31 proportional to the distance D2. As the distance D2 is greater than the distance D1 in the preferred embodiment, there is a net torque produced about the axis of rotation 68 of the separator element 31 in such a fashion to maintain the separator element 31 in the first position 42, adjacent to the support wall 43. In the preferred embodiment, the point 59 was positioned in such a manner to achieve the maximum possible distance D2 to maximize the aforedescribed net torque. In further addition, the oblique angle of the edge 58 is greater than the oblique angle of the edge 60 to minimize displacement of the trigger member 50 in moving between the two aforedescribed positions associated therewith.

The function of the support wall 43 is to inhibit the rotation of the separator element 31 in response to the aforedescribed net torque, thereby maintaining the separator element 31 in the first position 42.

It will be recognized by those skilled in the art that there are many other ways to achieve the same or similar functions previously discussed. Consequently, the description of the particular implementations described in the embodiments herein are not to be considered as limiting the present invention thereto. To the contrary, many other implementations which may differ from the foregoing description but have the same or similar function, would be apparent to one of ordinary skill in the art, and are to be considered within the spirit and scope of the present invention. This will become apparent from the description of the preferred embodiment hereafter.

The separator element 31 and the trigger member 50 each have yet further angled surfaces 63, 65 and 67, 69, as more fully discussed hereinafter.

In response to an application of the force 66 to the trigger element 50, the trigger element 50 will rotate about the pivot point 52 thereby removing the torque produced by the trigger element 50 about the axis of rotation 68 of the separator element 31. Thereafter, the torque produced by the spring 60 acting on the separator element 31 through the spring contact point 62 will effect the rotation of the separator element 31 from the first position 42 toward the second position 44. During the course of travel of the separator element 31 toward the second position 44, the oblique angled surfaces 40A, 40B, 40C, and 40D will come into contact with the cantilevered beams 18A, 18B, 18C, and 18D previously discussed with respect to FIG. 5, and the magnetic transducers 16A, 16B, 16C, and 16D will be removed from the corresponding surfaces of the rigid disks 12A and 12B. The separator element 31 will continue its rotational travel until it reaches the second position 44 wherein further rotational travel thereof will be inhibited by the stopping surface 70 of the separator element 31 (FIG. 6) coming into contact with the carriage 20. It should be particularly noted that during the course of travel of the separator element 31 from the position 42 to the position 44, the torque acting through the spring coupling point 62 thereon will increase. When the separator element 31 reaches the second position 44, the torque produced by the spring 61 on the separator element 31 acting through the spring coupling point 62 on the carriage 20 will act to hold the separator element 31 firmly against the carriage 20. Consequently, the separator element 31 is firmly held in the second position 44, thereby maintaining the magnetic heads 16A, 16B, 16C, and 16D in an unloaded state, while likewise inhibiting the radial travel thereof across the corresponding surfaces of the rigid disks 12A and 12B through the presence of the separator element 31 in the path of travel of the carriage 20. Thereafter, the force 66 may be removed from the trigger element 50.

Figure 8:
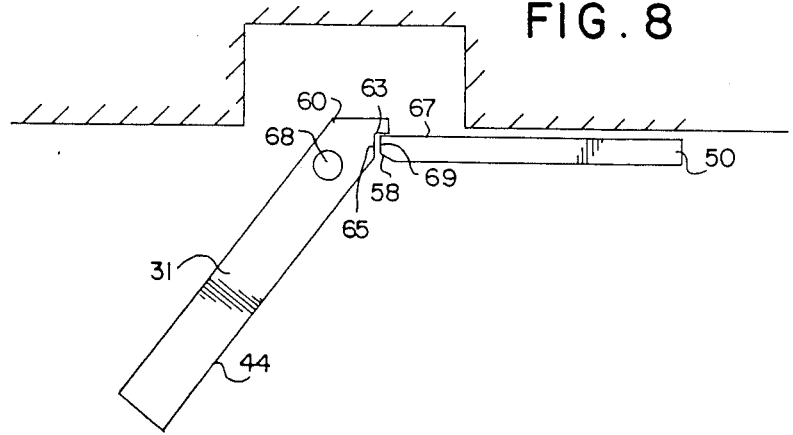
FIG. 8 is a top view of the apparatus of FIG. 6, illustrating the hinged separator element in the second position.

FIG. 8 illustrates the relationships between the separator element 31 and the trigger element 50 when the separator element 31 is in the second position 44, and the force 66 has been removed from the trigger member 50. Referring now to FIG. 8, subsequent to the separator element 31 achieving the placement of the position 44, and the removal of force 66 from the trigger member 50, the surfaces 63 and 65 of the separator element 31 will be parallel to and in abutting relationship with the surfaces 67 and 69, respectively, of the trigger member 50. The trigger member 50 is once again held in abutting relationship with the separator element 31 through the influence of the spring 61 between the spring contact 62 on the separator element 31 and the spring contact 64 on the trigger member 50. However, rotation of the separator element 31 in a direction opposite to the torque acting thereon is inhibited by the parallel and abutting relation between the surface 63 of the separator element 31 and the surface 67 of the trigger element 50. As a consequence thereof, the magnetic heads 16A, 16B, 16C, and 16D (FIG. 5) are prevented from moving in a radial fashion across the surface of the rigid disks 12A and 12B by a stopping surface 70 of the separator element 31 against the carriage 20 held in place by the aforedescribed relation between the surfaces 63 and 65 of the separator element 31, and the corresponding surfaces 67 and 69 of the trigger member 50.

Broadly stated, the magnetic heads 16A, 16B, 16C, and 16D may be returned to a loaded condition with respect to the rigid disks 12A and 12B by the re-application of the force 66 to the trigger member 50 (FIG. 6), the subsequent motion of the carriage 20 against the stopping surface 70 in such a fashion to restore the separator element 31 once again to the position 42, and the subsequent release of the force 66. In particular, the re-application of the force 66 will operate to remove the parallel and abutting relationship between the surfaces 63 and 65 of the separator element 31, and the corresponding surfaces 67 and 69 of the trigger member 50 (FIG. 8). Thereafter, motion of the carriage 20 against the stopping surface 70 of the separator element 31 will result in the rotation of the separator element 31 toward the position 42, and the concurrent loading of the magnetic heads 16A, 16B, 16C, and 16D onto the rigid disks 12A and 12B. It should be noted with respect to the return of the separator element 31 to the first position 42, that the operation of the carriage 20 against the separator element 31 does not effect the return of the separator element 31 to the first position 42, but rather the movement of the separator element 31 toward the first position 42. Subsequent to the aforedescribed motion of the carriage 20, the release of the trigger force 66 from the trigger member 50 operates to re-establish the previously described abutting relation between corresponding surfaces of the trigger element 50 and the separator element 31, i.e., the surfaces 58 and 60, respectively (FIGS. 6 and 7), thereby again establishing a net rotational torque about the axis of rotation 68 on the separator element 31 in a direction opposite to the torque produced by the spring 61 operating through the spring coupling point 62. The aforedescribed net torque effects the return of the separator element 31 to the first position 42.

While the foregoing has described the functions of the trigger element in terms of an implementation employing a pivoted member, i.e., the trigger member 50, it will be apparent to one of ordinary skill in the art that other implementations differing from the particular embodiment employed in the preferred embodiment described herein may likewise be employed; such alternate implementations performing the same or similar functions as those heretofore described. By way of illustration, a solenoid operated pin providing the same or similar function with respect to the abutting surfaces between the separator element and the trigger element could easily be conceived and implemented. Consequently, as was the case with respect to a particular implementation of the separator element, such alternate implementation of the functions of the trigger element are to be considered to be within the scope and spirit of the present invention.

While the foregoing will effect the loading and unloading of magnetic transducers from an associated rigid disk, as well as inhibiting the radial motion thereof, a more controlled loading and unloading of the magnetic transducers may be achieved through operation of the trigger element in conjunction with control of the rate of motion of the carriage 20. In particular, the carriage 20 is first moved to a selected position wherein the separator element will, in response to operating the trigger element, effect the motion of the separator element to a position wherein the separator element will be in contact with the carriage 20, but prior to the point of contact between the oblique angled surfaces therein coming into contact with the cantilevered beams associated with the magnetic transducers. Thereafter, by controlling the rate at which the carriage 20 is withdrawn, the rate at which the magnetic transducers are unloaded from the surface of the associated rigid disk may be directly controlled.

In a similar fashion, the manner in which the magnetic transducers are loaded may be likewise controlled. In particular, subsequent to the operation of the trigger element from a condition wherein the magnetic transducers are in an unloaded state as previously described, control of the rate at which the carriage 20 is advanced will directly control the rate at which the loading of the magnetic transducers is performed.

Figure 9:
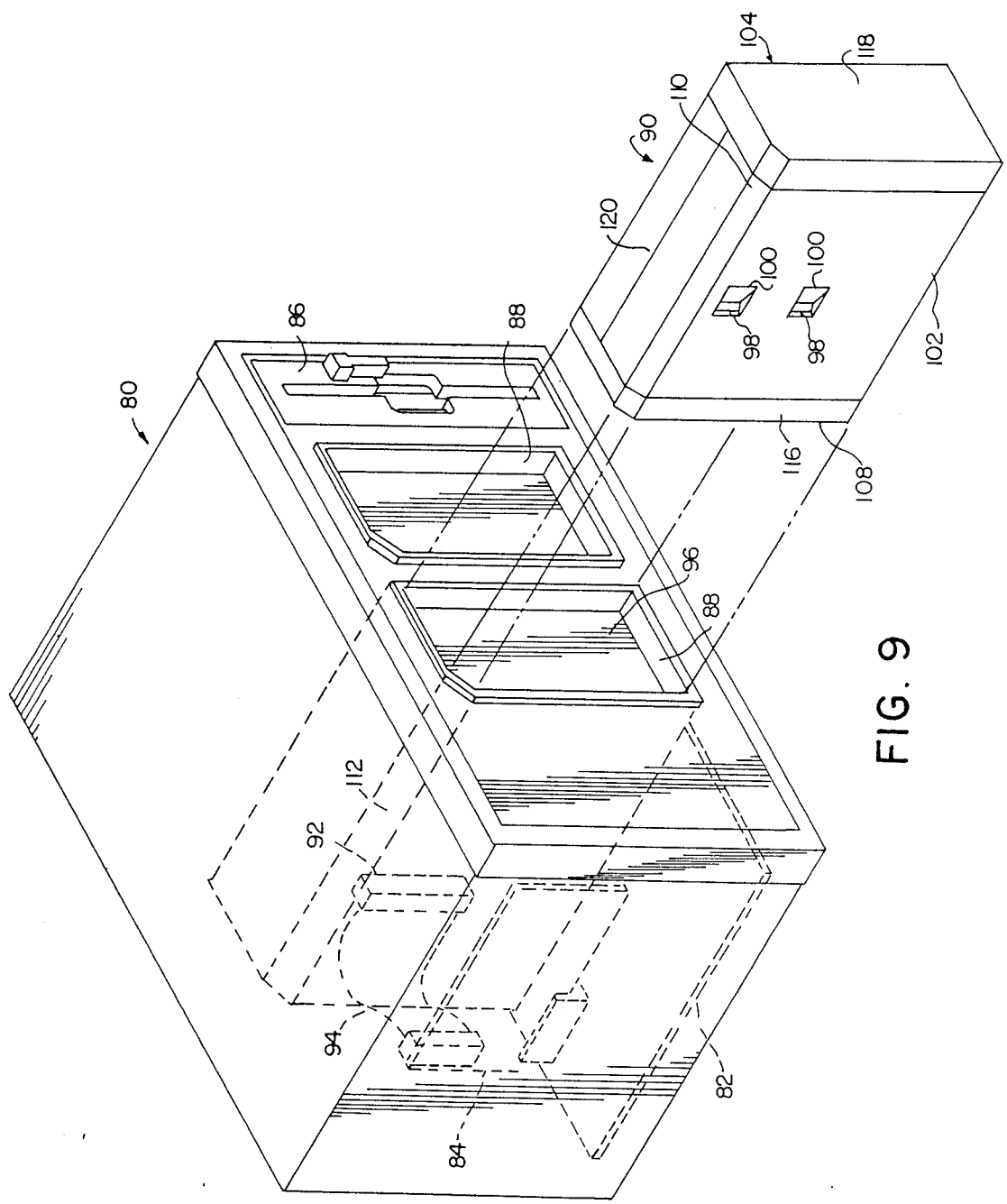
FIG. 9 is a perspective view of a microcomputer system for use with a plurality of removable hard disk drive modules, one of which is illustrated in FIG. 9 and includes a disk storage system in accordance with the invention.

FIG. 9 depicts a microcomputer system 80 which includes a power supply (not shown) and interconnected printed circuit boards 82 and 84 carrying electronic information and control signal processing circuits. One of the printed circuit boards 82 is the "mother board" while the other board 84 mounts disk drive circuits which carry power, data and control signals to and from the disk storage systems 10 used within the microcomputer system 80. The microcomputer system 80 includes a floppy disk drive 86.

The microcomputer system 80 has a pair of identical receptacles 88 configured to receive hard disk drive modules such as a module 90 shown in FIG. 9. The module 90 is principally comprised of a preferred embodiment of a disk storage system 10 in accordance with the invention as described hereafter. The rear portion of each receptacle 88 encloses an electrical connector assembly 92 connected by a ribbon cable 94 to the printed circuit board 84. Hinged to the front portion of each receptacle 88 is a door 96 that is spring-loaded to the closed position as shown in FIG. 9.

The details of the microcomputer system 80 and the manner in which it removably mounts the hard disk drive modules 90 therein are described in greater detail in a copending application of Warren L. Dalziel et al., Ser. No. 018,499, "HARD DISK DRIVE MODULE AND RECEPTACLE THEREFOR," filed Feb. 25, 1987, now U.S. Pat. No. 4,833,554 issued May 23, 1989, and commonly assigned with the present application. As described in the Dalziel et al. application, the microcomputer system 80 includes a mechanism which engages rear surfaces 98 of a pair of recesses 100 in a side 102 of an enclosure 104 for the module 90 when the module 90 is manually inserted and pushed to a forward position within the receptacle 88. The mechanism pulls the module 90 into a loaded position in which the electrical connector assembly 92 makes full contact with a mating electrical connector block 106 (shown in FIGS. 10 and 11) in a forward end 108 of the module 90. This enables electrical power and control and data signal information to be provided to the disk storage system 10 within the module 90. This provides for the application of power to a motor for rotatably driving rigid magnetic disks 12 within the module 90 and to a stepper motor for operating the head carriage assembly 22 forming a part of the data storage system 10 within the module 90. Such motors are shown and described hereafter. Data signal information is communicated between the printed circuit board 84 and the magnetic transducers 16 within the data storage system 10.

As further described in the Dalziel et al. application, the mechanism within the microcomputer system 80 is also operative to release the module 90 from the loaded position so that the module 90 can then be withdrawn by hand from the receptacle 88 and removed from the microcomputer system 80.

The module 90 is conveniently removed from the microcomputer system 80 for storage or transport. Typically, such storage or transport subjects the module 90 to considerable motion including occasional shocks and jarring motions. In accordance with the invention, however, the magnetic transducers 16 of the disk storage system 10 contained within the module 90 are moved into and maintained within the unloaded position when the module 90 is removed from the microcomputer system 80. This prevents damaging contact between the magnetic transducers 16 and the surfaces of the rigid magnetic disks 12.

As shown in FIG. 9 the enclosure 104 of the module 90 has a beveled edge 110 extending along the length of the enclosure 104. The beveled edge 110 of the module 90 mates with a corresponding beveled edge 112 of the receptacle 88 when the module 90 is inserted in the receptacle 22. This assures correct orientation of the module 90 in the receptacle 88.

Figure 10:
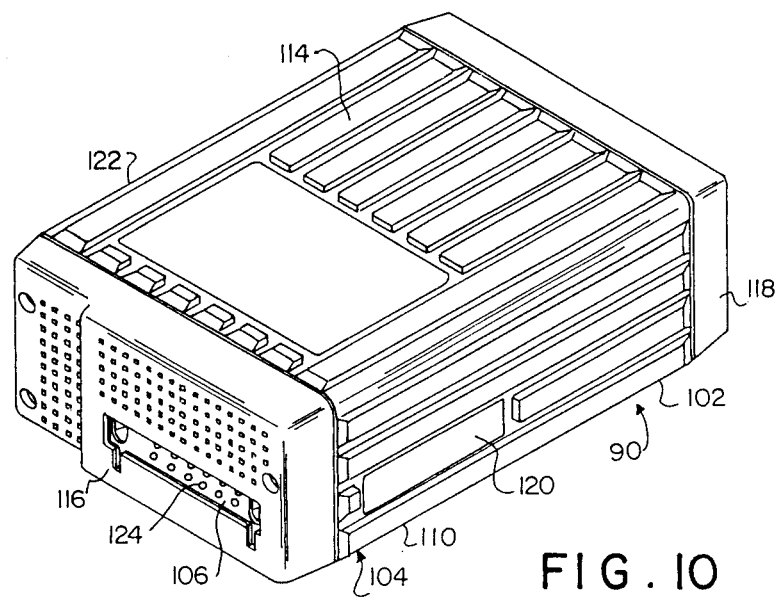
FIG. 10 is a perspective view of the hard disk drive module of FIG. 9.

FIG. 10 shows the module 90 including the enclosure 104 thereof. The module 90 is shown in a different position in FIG. 10 from that of FIG. 9 so that the side 102 thereof which includes the pair of recesses 100 is on the bottom and out of sight in FIG. 10. Instead, an opposite side 114 of the enclosure 104 is shown together with a front end cap 116 and an opposite rear end cap 118. A top surface 120 extends between the side 114 and the beveled edge 110. The enclosure 104 also has a bottom surface 122 opposite the top surface 120.

The front end cap 116 has an elongated slot 124 therein for providing access to the electrical connector block 106. As previously noted the electrical connector assembly 92 within the microcomputer system 80 is coupled to the electrical connector block 106 whenever the module 90 is pulled into the loaded position within the receptacle 88 in the microcomputer system 80.

Figure 11:
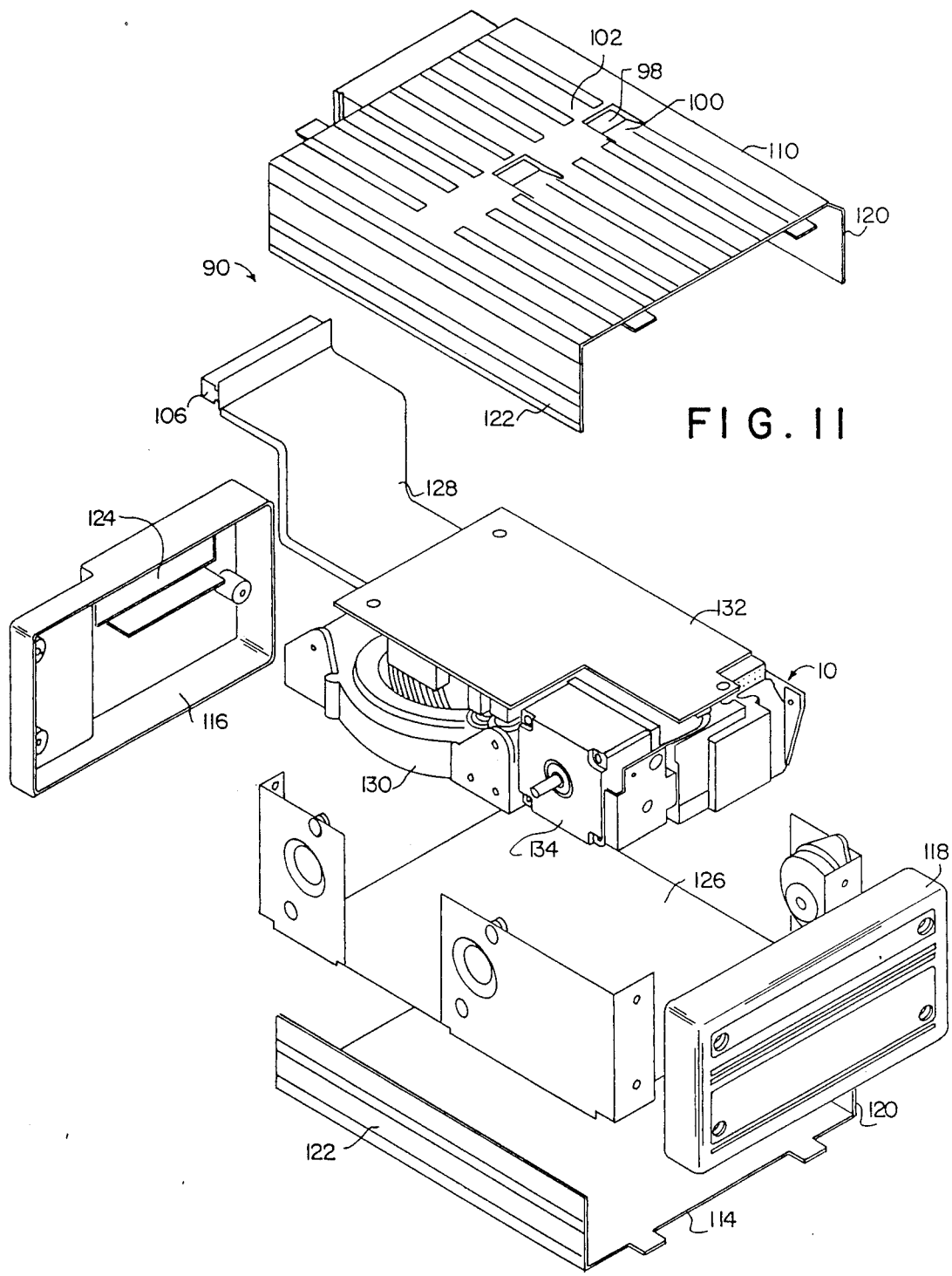
FIG. 11 is an exploded perspective view of the hard disk drive module of FIG. 9 showing the disk storage system therein.

FIG. 11 is an exploded view of the module 90. As shown therein the enclosure 104 encloses a sheet metal chassis 126 therein. The sheet metal chassis 126 in turn mounts the disk storage system 10 thereon. The disk storage system 10 is coupled to the electrical connector block 106 by a wire bus 128. The electrical connector block 106 is mounted just behind the elongated slot 124 in the front end cap 116 of the enclosure 104. The enclosure 104 is formed by the two end caps 116 and 118 together with opposite mating half shells which join together to form the top and bottom surface 120 an 122 as well as the sides 102 and 114.

The preferred form of the disk storage system 10 shown in FIG. 11, and hereinafter in detail in FIGS. 12–20, includes an elongated, generally rectangular housing 130 containing a pair of the rigid magnetic disks 12 (not shown in FIG. 11). The rigid magnetic disks are driven by a motor which is hidden from view in FIG. 11 by a circuit board 132 coupled to one of the broad surfaces of the housing 130. A stepper motor 134 is mounted on the housing 130. As described hereafter, the stepper motor 134 forms a portion of the head carriage assembly 22 of the disk storage system 10 and is operative to position a carriage radially relative to the magnetic disks.

Figure 12:
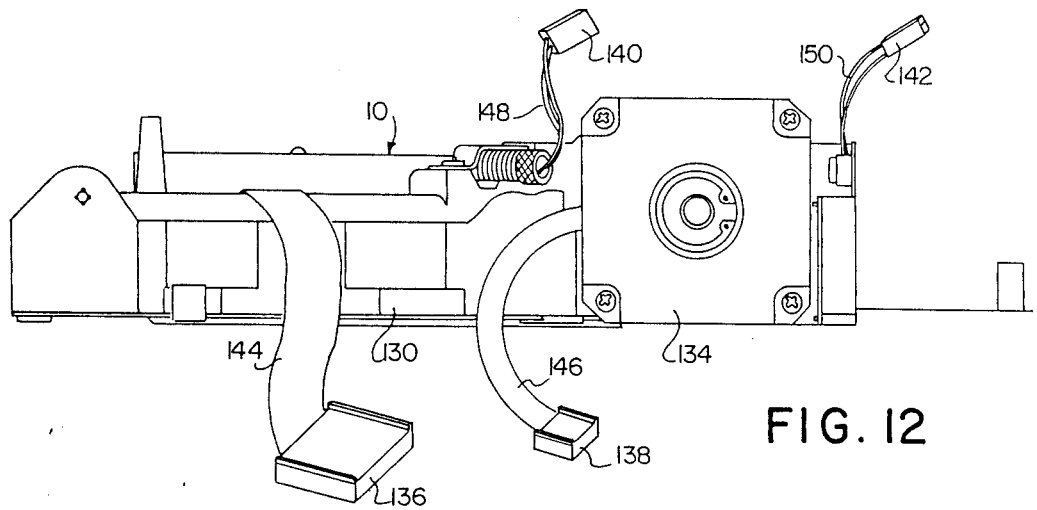
FIG. 12 is a side view of the disk storage system of FIG. 11.

FIG. 12 is a side view of the disk storage system 10 of FIG. 11 with the circuit board 132 removed. As shown in FIG. 12 the disk storage system 10 has four different electrical connectors 136, 138, 140 and 142 coupled respectively by wire buses 144, 146, 148 and 150 to different portions of the disk storage system 10. The electrical connectors 136, 138, 140 and 142 are coupled to the circuit board 132 when the circuit board 132 is coupled to the broad surface of the housing 130 as shown in FIG. 11. External connection of the circuit board 132 is provided by the wire bus 138 and the electrical connector block 106 as previously described. This provides external electrical connection to various portions of the disk storage system 10 including the motor for driving the magnetic disks, the magnetic transducers, the stepper motor 134 for positioning the carriage and a solenoid assembly for operating the trigger member 50 in order to operate the separator element 30.

Figure 13:
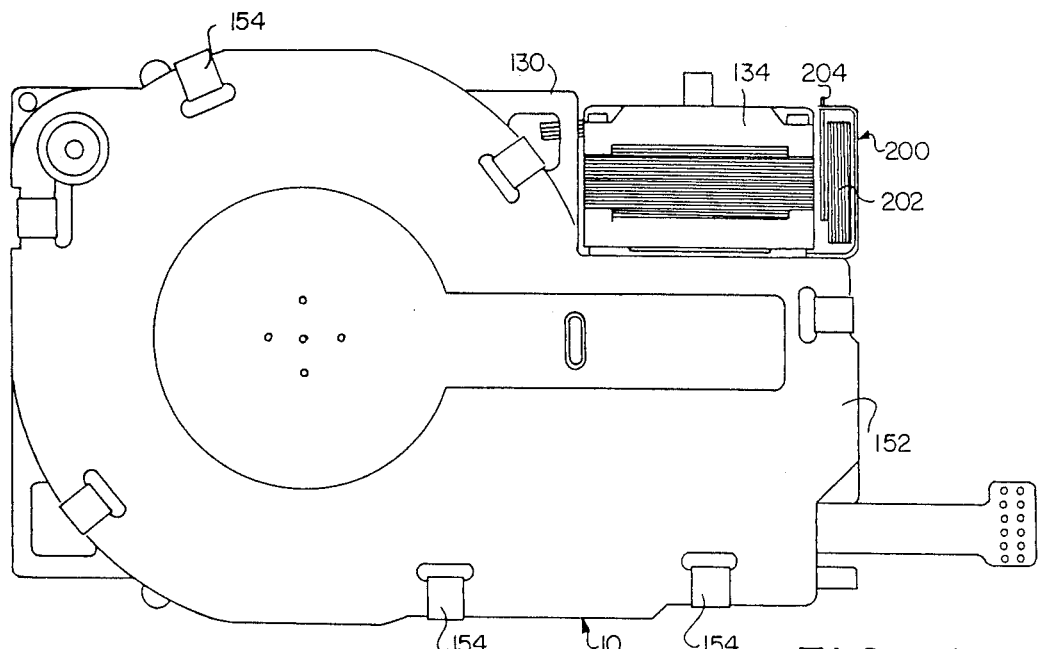
FIG. 13 is a plan view of the disk storage system of FIG. 11 with a cover in place thereon.

FIG. 13 shows the disk storage system 10 with a cover 152 mounted on the housing 130. The cover 152 which is coupled to the opposite broad surface of the housing 130 from the circuit board 132 is held in place by a plurality of clips 154. The cover 152 combines with the interior of the housing 130 to provide an air-tight enclosure for the rigid magnetic disks and the magnetic transducers.

Figure 14:
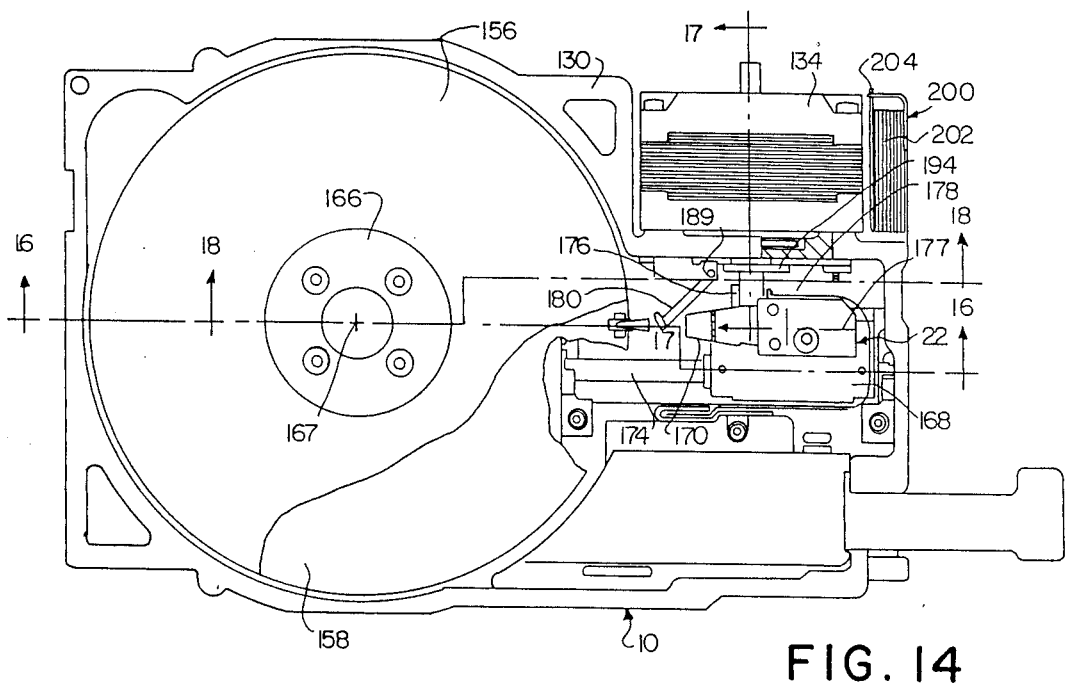
FIG. 14 is a plan view of the disk storage system of FIG. 11 which plan view is like the plan view of FIG. 13 but with the cover removed.

FIG. 14 is a view of the disk storage system 10 similar to the view of FIG. 13 but with the cover 152 removed to show some of the interior details of the disk storage system 10. As shown in FIG. 14, the disk storage system 10 includes a pair of the rigid magnetic disks 12 in the form of magnetic disks 156 and 158 mounted in generally parallel, spaced-apart relation. As shown in the sectional view of FIG. 16, the magnetic disks 156 and 158 are coupled to a drive motor 160 therefor by a rotatable spindle 162 supporting the magnetic disk 158, a spacer 164 disposed between the magnetic disks 156 and 158, and a disk clamp 166 disposed on top of the magnetic disk 156 opposite the spacer 164. This enables the magnetic disks 156 and 158 to rotate about an axis of rotation 167 therefor in response to the drive motor 160.

Figure 16:
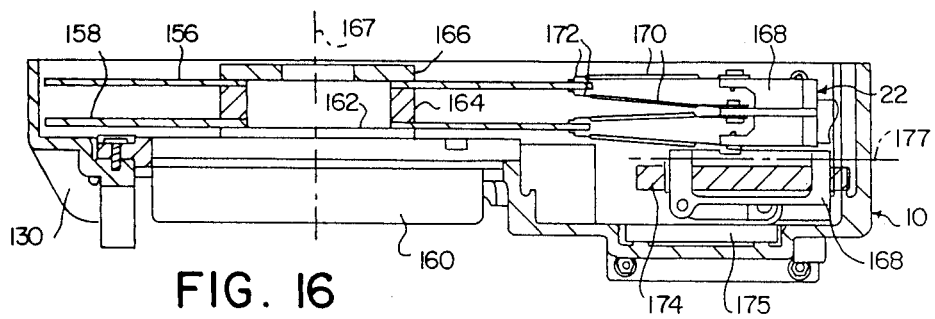
FIG. 16 is a sectional view of the disk storage system of FIG. 11 taken along the line 16—16 of FIG. 14.
Figure 17:
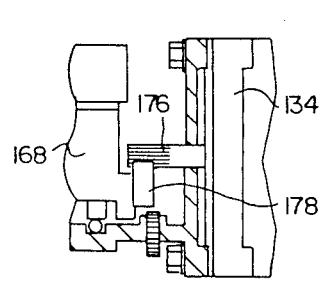
FIG. 17 is a sectional view of the disk storage system of FIG. 11 taken along the line 17—17 of FIG. 14.

The details of the head carriage assembly 22 are perhaps best shown in FIGS. 14, 16 and 17. The head carriage assembly 22 includes a carriage 168 having four different cantilevered beams 170 mounted thereon. The cantilevered beams 170 are divided into pairs disposed on opposite sides of the magnetic disks 156 and 158 and mounting magnetic transducers 172 so that the transducers 172 are disposed at opposite side surfaces of the magnetic disks 156 and 158.

The carriage 168 is slidably mounted on a guide rod 174 mounted within the housing 130 to permit radial movement of the carriage 168 relative to the magnetic disks 156 and 158 in opposite directions. The carriage 168 also engages a guide rod 175 positioned at the bottom of the housing 130 spaced apart from and parallel to the guide rod 174. The guide rod 175 is shown in FIG. 16. Both guide rods 174 and 175 are parallel to a radial axis 177 along which the carriage 168 moves. The radial axis 177 intersects and is perpendicular to the axis of rotation 167 of the magnetic disks 156 and 158.

The stepper motor 134 which has a pinion gear 176 mounted on the shaft thereof is employed to move the carriage 168 along the guide rods 174 and 175. The pinion gear 176 engages a gear rack 178 coupled to the carriage 168. As the stepper motor 134 rotates, the pinion gear 176 rotates so as to move the gear rack 178 and the attached carriage 168 in one direction or the other along the guide rods 174 and 175.

In the disk storage system 10 of FIGS. 11–20 the separator element 30 is comprised of a separator element 180 which has a pair of arms 182 and 184 extending outwardly from a common member 186 together with a lower arm 188. The arm 182 is positioned so as to move between and engage the upper pair of cantilevered beams 170 which are associated with the magnetic disk 156. The arm 184 is positioned to move between and engage the lower pair of cantilevered beams 170 associated with the magnetic disk 158. The lower arm 188 engages and prevents movement of the carriage 168 when the separator element 180 is locked in the second position.

The separator element 30 is rotatable about a pivot axis 189 which is in a fixed location relative to and is generally parallel to the axis of rotation 167 of the magnetic disks 156 and 158. The separator element 30 is positioned such that the pivot axis 189 thereof is located to the side and spaced-apart from the radial axis 177 for the carriage 168 between the carriage 168 and the magnetic disks 156 and 158.

Figure 20:
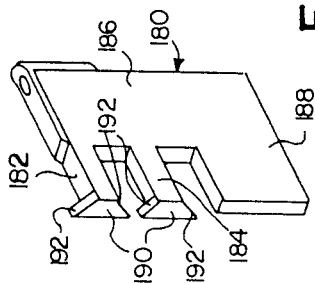
FIG. 20 is a perspective view of the separator element of the disk storage system of FIG. 11.
Figure 15:
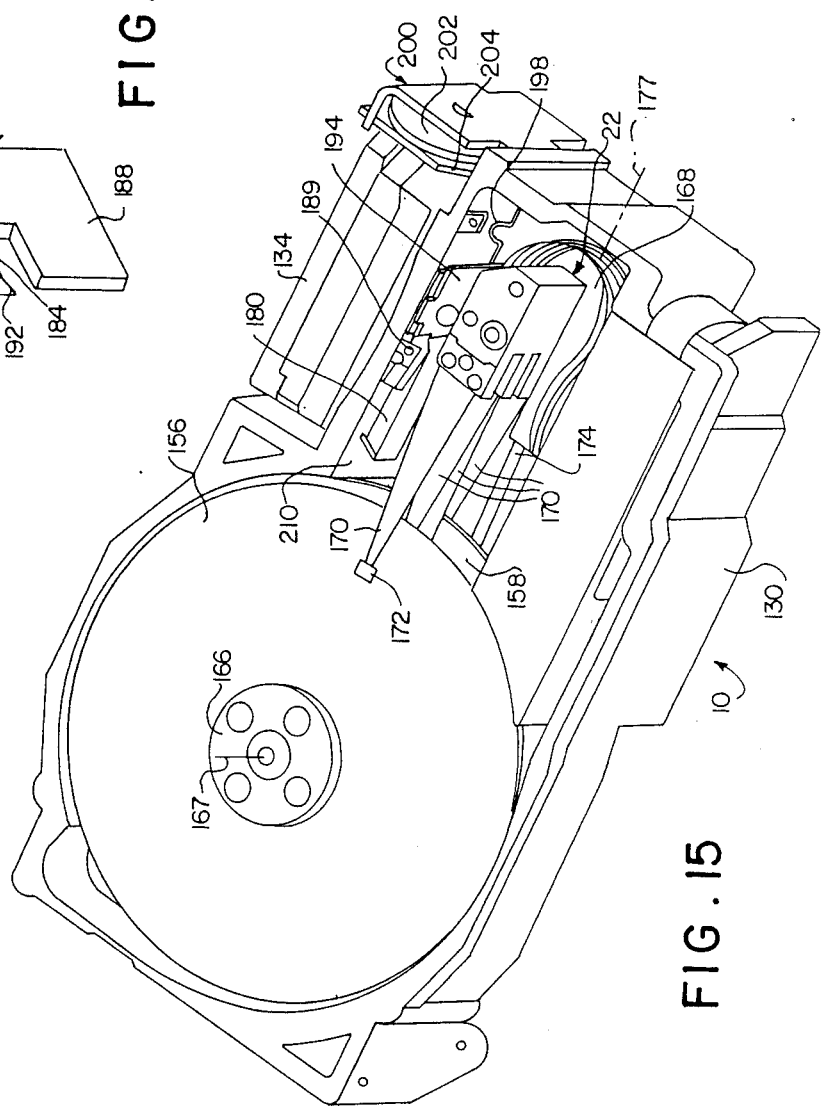
FIG. 15 is a perspective view of the disk storage system of FIG. 11.

As best shown in FIG. 20, each of the arms 182 and 184 is provided at the outer end thereof with a partially triangular-shaped element 190 having opposite sloped edges 192. The sloped edges 192 comprise selectively angled surfaces which function in a manner similar to the surfaces 40, 40A, 40B, 40C and 40D previously described upon engaging the associated cantilevered beams 170 to raise or lower the beams 170 and thereby unload or load the magnetic transducers 172. The sloped edges 192 are of oblique angles to the surfaces of the magnetic disks 156 and 158.

Figure 18:
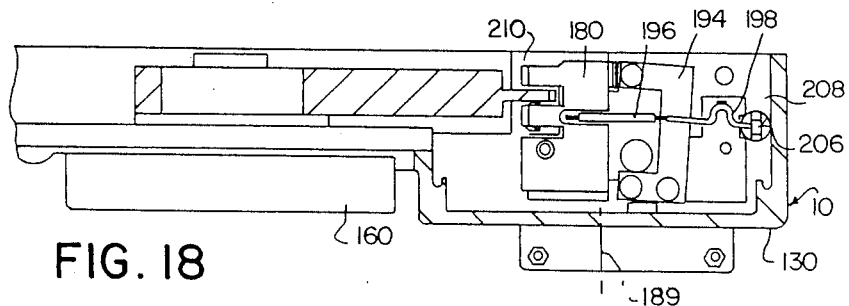
FIG. 18 is a sectional view of the disk storage system of FIG. 11 taken along the line 18—18 of FIG. 14.
Figure 19:
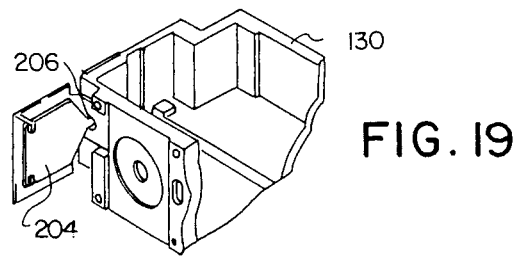
FIG. 19 is a perspective view of a portion of the disk storage system of FIG. 11 illustrating a portion of a solenoid assembly for operating the trigger member.

As best shown in FIG. 18, the disk storage system 10 includes a trigger member 194 which is configured similarly to and which functions in essentially the same manner as the trigger member 50 shown in FIGS. 6–8, in conjunction with the separator element 180. A spring 196 functions in the manner of the spring 61 of FIGS. 6–8 to maintain the trigger member 194 engaged with the separator element 180 except when the trigger force 66 is present. The trigger force 66 depicted in FIG. 6 is provided in the embodiment of FIGS. 11–20 by an arrangement which includes a link 198 and a solenoid assembly 200. The solenoid assembly 200 includes a magnetic coil 202 which, as best shown in FIGS. 13 and 14, is mounted in a corner of the housing 130 adjacent an end of the stepper motor 134. In addition to the magnetic coil 202, the solenoid assembly 200 includes an armature 204 disposed at one side of the magnetic coil 202. As shown in FIGS. 18 and 19, the armature 204 includes an elongated arm 206 at the side thereof which extends through an aperture in a wall 208 of the housing 130 and into engagement with an end of the link 198. The opposite end of the link 198 is coupled to the trigger member 194.

The arrangement comprised of the link 198 and the solenoid assembly 200 provides the trigger force 66 whenever the magnetic coil 202 is energized. This draws the armature 204 into contact with the magnetic coil 202, so that the elongated arm 206 of the armature 204 pulls the link 198 against the resistance of the spring 196 to pivot and disengage the trigger member 194 from the separator element 180. As soon as the magnetic coil 202 is deenergized, the trigger force 66 is removed and the spring 196 controls the separator element 180.

The separator element 180 and the trigger member 194 are provided with the same engaging surfaces and operate in the same manner as described in connection with FIGS. 6–8. When the magnetic transducers 172 are to be unloaded, the carriage 168 is moved away from the magnetic disks 156 and 158 by the stepper motor 134 and the solenoid assembly 200 is momentarily energized. This disengages the trigger member 194 from the separator element 180 long enough for the spring 196 to pull the separator element 180 from the first position adjacent a support wall 210 formed by the housing 130 into the second position. As the separator element 180 moves into the second position, the partially triangular-shaped elements 190 at the ends of the arms 182 and 184 engage and spread apart the associated pairs of cantilevered beams 170 to raise and unload the magnetic transducers 172. When the separator element 180 reaches the second position, it becomes locked in that position in the manner described in connection with FIG. 8. The lower arm 188 of the separator element 180 engages the carriage 168 to prevent inadvertent movement of the carriage 168 toward the magnetic disks 156 and 158.

Movement of the separator element 180 back into the first position from the second position is initiated by momentarily energizing the solenoid assembly 200 to disengage the trigger member 194 from the separator element 180 while simultaneously driving the stepper motor 134 to move the carriage 168 toward the magnetic disks 156 and 158. As the carriage 168 moves toward the magnetic disks 156 and 158, the carriage 168 engages the lower arm 188 of the separator element 180 and pushes the separator element 180 into the first position adjacent the wall 208. The trigger member 194 engages the separator element 180 and locks the separator element 180 in the first position in the manner described in connection with FIG. 7.

While the foregoing has described particular configurations employed in preferred embodiments of the present invention, it will be recognized by those skilled in the art that many changes or modifications may be made to the foregoing described configurations to achieve the same or similar results. Consequently, the foregoing described configurations are not to be interpreted in a manner so as to limit the inventive concept embraced herein thereto, and all such changes or modifications are to be considered within the spirit and scope of the present invention, limited only by the scope of the following claims.

What is claimed is:

1. A removable, portable rigid disk drive module for use in a microcomputer system, the module being comprised of an enclosure adapted to be removably installed in a microcomputer system and a disk storage system within the enclosure, the disk storage system including at least one rigid magnetic disk, said at least one disk having opposed surfaces, a cantilevered beam mounted adjacent each surface of said at least one disk, a magnetic transducer mounted on each cantilevered beam, each cantilevered beam normally disposing the associated transducer in a loaded position proximate the associated surface of said at least one disk, and means for moving the cantilevered beams away from the associated surfaces of said at least one disk to place the associated transducers in an unloaded position away from the associated surfaces of said at least one disk, the means for moving the cantilevered beams including a pivotable separator element normally assuming a first position spaced-apart from the cantilevered beams and means for selectively moving the separator element into a second position in which the separator element engages the cantilevered beams to move the cantilevered beams away from their associated disk surfaces to place the transducers in the unloaded position, the means for moving the cantilevered beams further including resilient means coupled to the separator element, means for latching the separator element in the first position and means associated with the latching means for momentarily unlatching the separator element in response to an external command to allow the resilient means to move the separator element from the first position to the second position.

2. The invention set forth in claim 1, wherein the cantilevered beams are mounted on a carriage which is movable relative to said at least one disk and the means for latching is also operative to latch the separator element in the second position when the separator element is moved to the second position, and further including means for momentarily unlatching the separator element in response to an external command to allow the separator element to be moved to the first position in response to movement of the carriage toward the disk.

3. The invention set forth in claim 2, wherein the carriage is movable relative to said at least one disk along a carriage axis which is generally radial relative to said at least one disk, said at least one disk is rotatable about an axis of rotation therefor, and the separator element is pivotable about a pivot axis which is generally parallel to and in a fixed location relative to the axis of rotation of said at least one disk, the pivot axis of the separator element being disposed to the side of and spaced-apart from the carriage axis between the carriage and said at least one disk.

* * * * *